(12) United States Patent
Sarraf et al.

(10) Patent No.: US 6,817,097 B2
(45) Date of Patent: Nov. 16, 2004

(54) FLAT PLATE FUEL CELL COOLER

(75) Inventors: David B. Sarraf, Elizabethtown, PA (US); Joel T. Schwendemann, Lancaster, PA (US)

(73) Assignee: Thermal Corp., Stanton, DE (US)

( * ) Notice: Subject to any disclaimer, the term of this patent is extended or adjusted under 35 U.S.C. 154(b) by 261 days.

(21) Appl. No.: 10/105,693

(22) Filed: Mar. 25, 2002

(65) Prior Publication Data

US 2003/0180589 A1 Sep. 25, 2003

(51) Int. Cl.[7] .................. B23P 6/00; H01M 8/04; H01M 2/08
(52) U.S. Cl. ............. 29/890.032; 429/26; 429/36
(58) Field of Search .............. 429/26, 120, 36, 429/34; 29/890.032, 890.038, 890.054; 165/104.26, 104.21

(56) References Cited

U.S. PATENT DOCUMENTS

| | | | | | |
|---|---|---|---|---|---|
| 3,958,627 | A | * | 5/1976 | Edelstein .............. | 165/273 |
| 4,640,347 | A | * | 2/1987 | Grover et al. .......... | 165/104.26 |
| 4,674,565 | A | * | 6/1987 | Beam ................... | 165/104.26 |
| 5,064,732 | A | * | 11/1991 | Meyer .................. | 429/13 |
| 5,358,799 | A | * | 10/1994 | Gardner ................ | 429/26 |
| 5,560,423 | A | | 10/1996 | Larson et al. .......... | 165/104.26 |
| 6,146,779 | A | * | 11/2000 | Walsh .................. | 429/26 |
| 6,355,368 | B1 | | 3/2002 | Kralick ................ | 429/26 |
| 6,397,935 | B1 | * | 6/2002 | Yamamoto et al. ..... | 165/104.26 |

FOREIGN PATENT DOCUMENTS

| | | |
|---|---|---|
| JP | 60089687 | 5/1985 |
| JP | 63254393 | 10/1988 |
| JP | 1263490 | 10/1989 |
| JP | 9318282 | 12/1997 |
| JP | 10306989 | 11/1998 |

* cited by examiner

*Primary Examiner*—Carol Chaney
*Assistant Examiner*—Thomas H. Parsons
(74) *Attorney, Agent, or Firm*—Duane Morris LLP

(57) ABSTRACT

A heat pipe assembly includes a base plate and a corrugated lid joined to the base plate to form a plurality of tubes between the base plate and the corrugated lid. Each of the plurality of tubes forms an envelope of a respective heat pipe within the heat pipe assembly. The heat pipe assembly may be included in a fuel cell stack.

31 Claims, 6 Drawing Sheets

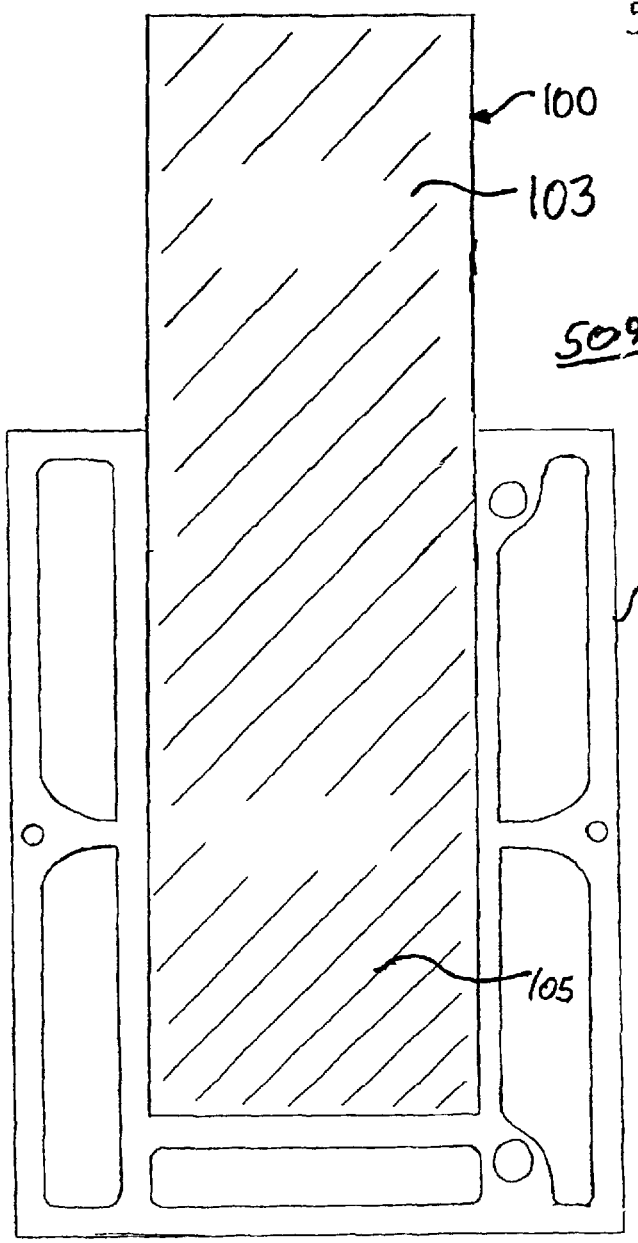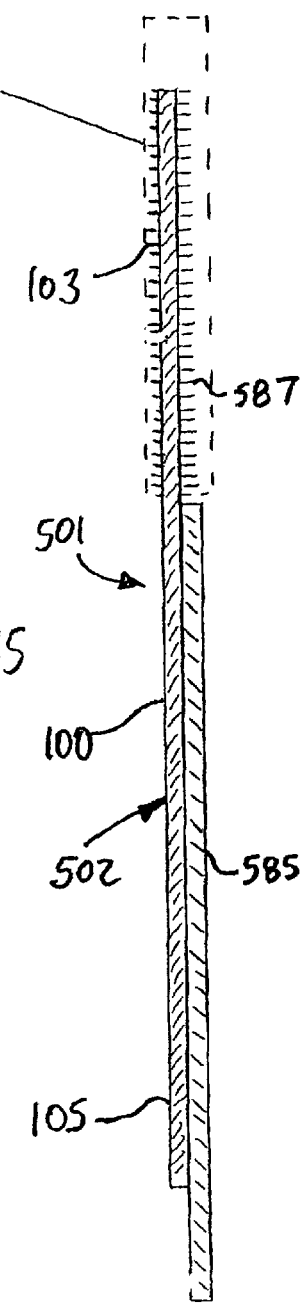

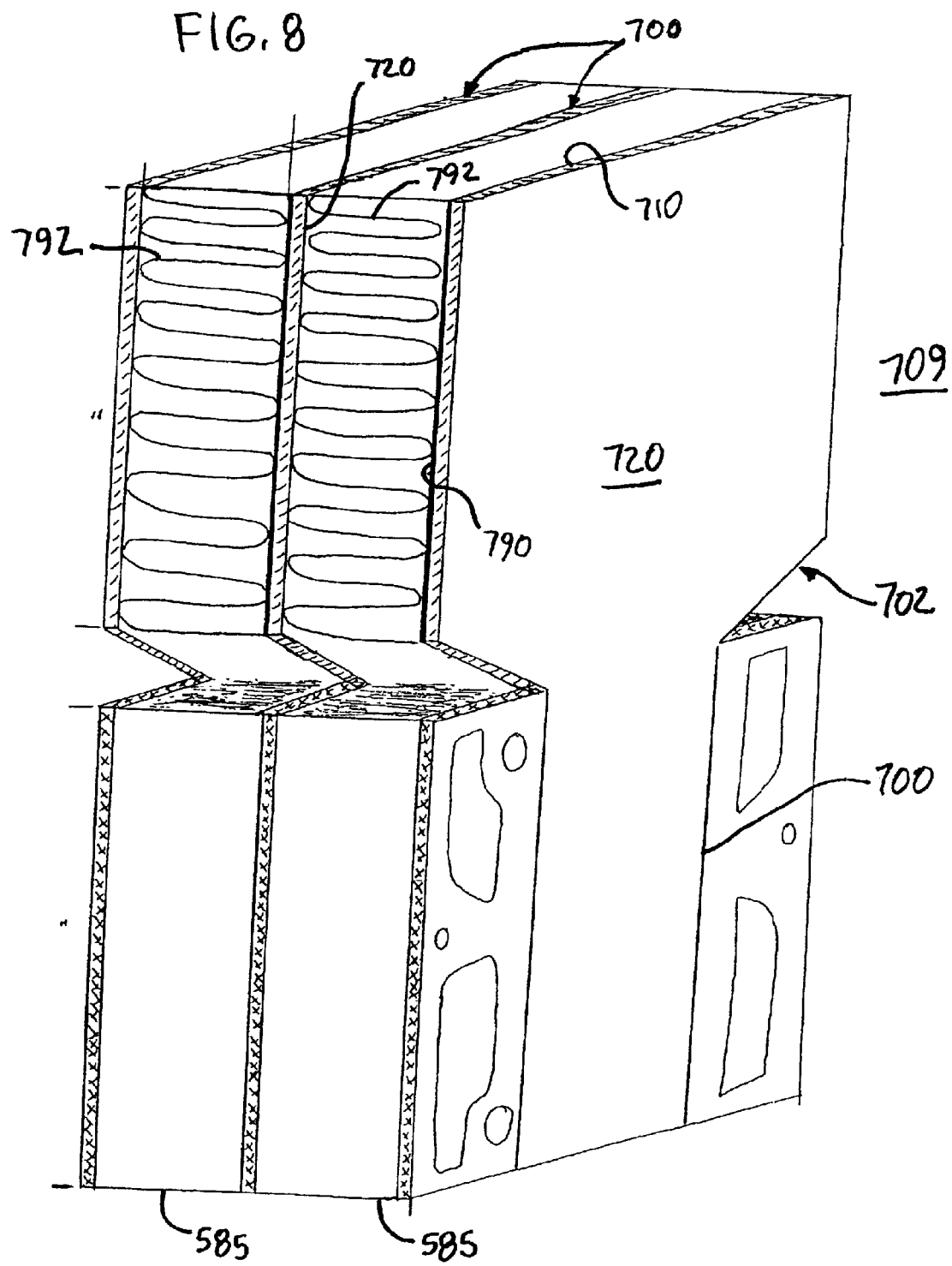

FLAT PLATE FUEL CELL COOLER

FIELD OF THE INVENTION

The present invention is related to thermal control systems generally, and more specifically to thermal control systems including heat pipes.

BACKGROUND OF THE INVENTION

Fuel cells convert chemical energy to electrical energy and, as a byproduct, waste heat that must be rejected. The power levels and fluxes of a cell are typically low, but the surface area is large. Also, because fuel cells are often included in stacks of several cells, the surface area requiring heat transfer is substantial. This causes a problem if conventional heat pipes are applied to this class of cooling task. The fluxes and power levels are typical of the capacity of an inexpensive three-millimeter heat pipe. However, because the heat reject area is large, and it is necessary to cool at least every other cell in the stack, the number of conventional heat pipes needed grows rapidly. In addition, the conventional heat pipes require a mounting plate or spreader to maintain alignment and to effect heat transfer from the fuel cell components. As a result, conventional heat pipe solutions are often not cost effective.

Conventional fuel cell designs use a pumped oil loop to cool the fuel cell stack. Although pumped oil meets current performance needs, it has several disadvantages. Oil is a combustible fluid and is not environmentally friendly. An oversized pump is required to push the oil through the fuel cell at lower temperatures (e.g., during winter), when the oil's viscosity increases. Further, a pump has many moving parts that may break and require maintenance, increasing costs.

An alternative device suitable for removing heat from objects having large surface areas is desired.

SUMMARY OF THE INVENTION

The present invention is a heat pipe assembly, comprising a base plate and a corrugated lid joined to the base plate to form a plurality of tubes therebetween. Each of the plurality of tubes forms an envelope of a respective heat pipe within the heat pipe assembly.

BRIEF DESCRIPTION OF THE DRAWINGS

FIG. 5 is a front elevation view of a first exemplary fuel cell stack including either the heat pipe assembly of FIG. 3 or the heat pipe assembly of FIG. 4.

FIG. 6 is a side elevation view of an exemplary heat pipe assembly and fuel cell from the fuel cell stack of FIG. 5.

FIG. 8 is an isometric view of the fuel cell stack shown in FIG. 7.

DETAILED DESCRIPTION

Figure 1:
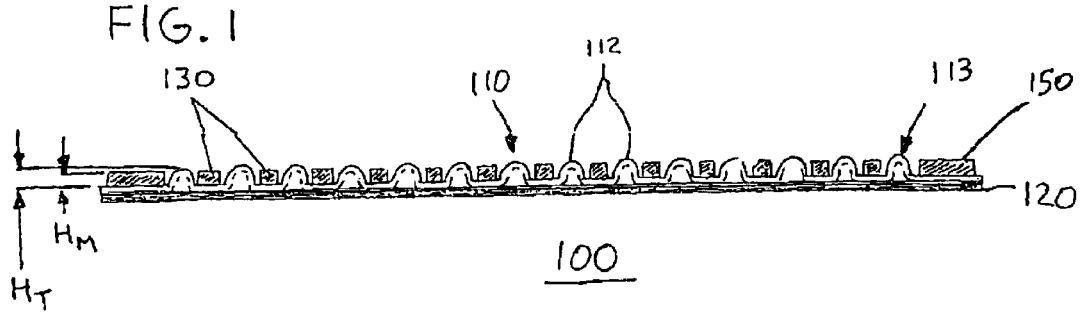
FIG. 1 is top plan view of an exemplary embodiment of a heat pipe assembly according to the present invention, prior to application of a load.

FIG. 1 is a top plan view of a heat pipe assembly 100, comprising a base plate 120 and a corrugated lid 110. The corrugated lid 110 is joined to the base plate 120 to form a plurality of tubes 112 therebetween. Each of the plurality of tubes 112 forms an envelope of a respective heat pipe 113 within the heat pipe assembly 100. Each heat pipe 113 has an evaporator 113a and a condenser 113b. Thus, the assembly 100 has an evaporator section 105 in which the evaporators 113a of heat pipes 113 are located, and a condenser section 103 in which the condensers 113b are located.

The heat pipe assembly 100 has at least one strip of material 130 between an adjacent pair of tubes 112 from among the plurality of tubes. Preferably, the heat pipe assembly 100 has at least three tubes 112 and at least two strips of material 130, each respective pair of adjacent tubes having a strip of material between the tubes in the pair.

Figure 3:
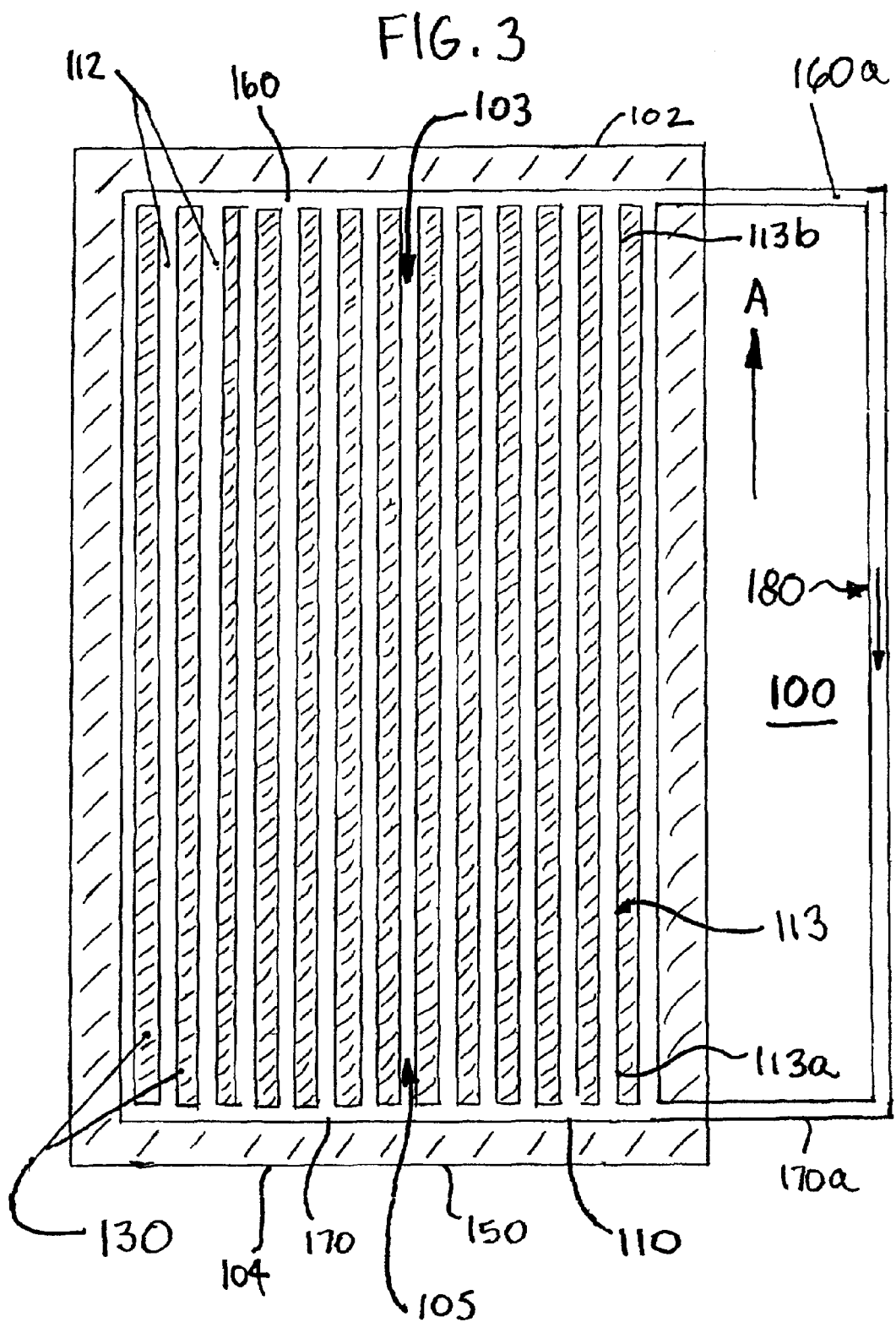
FIG. 3 is a front elevation view of the heat pipe assembly of FIG. 1.

Each of the plurality of tubes 112 and the strips of material 130 have a height in a direction perpendicular to an axial direction A of the tubes (shown in FIG. 3).

Figure 2:
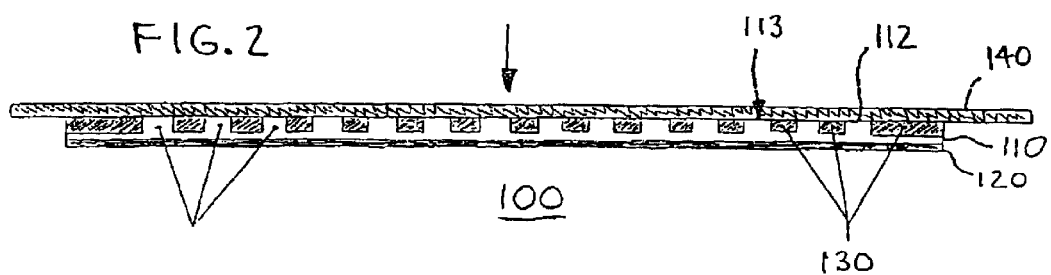
FIG. 2 is a top plan view of the heat pipe assembly of FIG. 1, after application of a load that flattens the heat pipes.

FIG. 2 shows the assembly after a load 140 is applied. As shown in FIG. 2, load 140 flattens a side surface of each of the plurality of tubes. Flattening increases the contact area and provides intimate contact between the top and the stack member. At the completion of the flattening operation, the height $H_T$ of the tubes is reduced to the height $H_M$ of the strip of material.

The strips of material 130 act as stops to limit flattening of the side surfaces of the plurality of tubes 112, so as to control the deformation. The strips of material 130 allow the assembly 100 to withstand a predetermined crush load. For example, for the ability to withstand a crush load of 200 pounds per square inch ($1.38 \times 10^6$ Newtons/square meter), every pair of adjacent tubes 112 may be provided with a strip of material 130 therebetween, which may be a plastic (polymer) material. The controlled crush and grooved geometry of corrugated lid 110 provide good thermal contact without rigid flatness requirements. Additional pieces 150 of material may be placed around the perimeter of the heat pipe assembly 100 to provide even load distribution.

Different crush loads may be accommodated by different materials. If strips of material 130 are formed from a material having sufficient strength and sufficiently small Young's modulus, it may not be necessary to include a strip 130 between every pair of tubes 112; for example, a strip between every second or third pair of tubes may be sufficient.

The base plate 120 and corrugated lid 110 are both formed of high conductivity materials, such as copper, aluminum, stainless steel and the like. For example, a 0.25–0.5 millimeter (0.01–0.02 inch) copper sheet material may be used. The corrugated lid 110 may be formed from a flat sheet by stamping the embossed pattern with a hydraulic press.

The corrugated lid 110 may be attached to the base plate 120 by a welding joint or a brazing joint. Other joining techniques, such as soldering, use of conductive adhesives, and the like, may also be practiced.

In one embodiment, shown in FIG. 3, all of the plurality of tubes 112 are connected by common connecting passages 160 and/or 170 at one end or at both ends, allowing communication of fluid between heat pipes 113. This evens out the pressure among the heat pipes 113, resulting in more even heat transfer throughout the assembly 100. If connecting tubes 160 and/or 170 are present, this tends to equalize any temperature gradients across the plate by allowing all of the heat pipes 113 to operate at the same vapor pressure.

Optionally, the connecting tubes 160 and 170 may be part of a manifold 180 connecting a vapor outlet of each heat pipe 113 and a liquid return line of each heat pipe together, to form a quasi-loop or racetrack-type heat pipe. This can mitigate the potential problem of entrainment resulting from the wickless walls of the exemplary heat pipes 113. It can also allow the heat sink to be placed beside the evaporator section 105, rather than directly above it. Alternatively, connecting tube 160 can be completely independent of connecting tube 170, with no return line connecting them.

Figure 4:
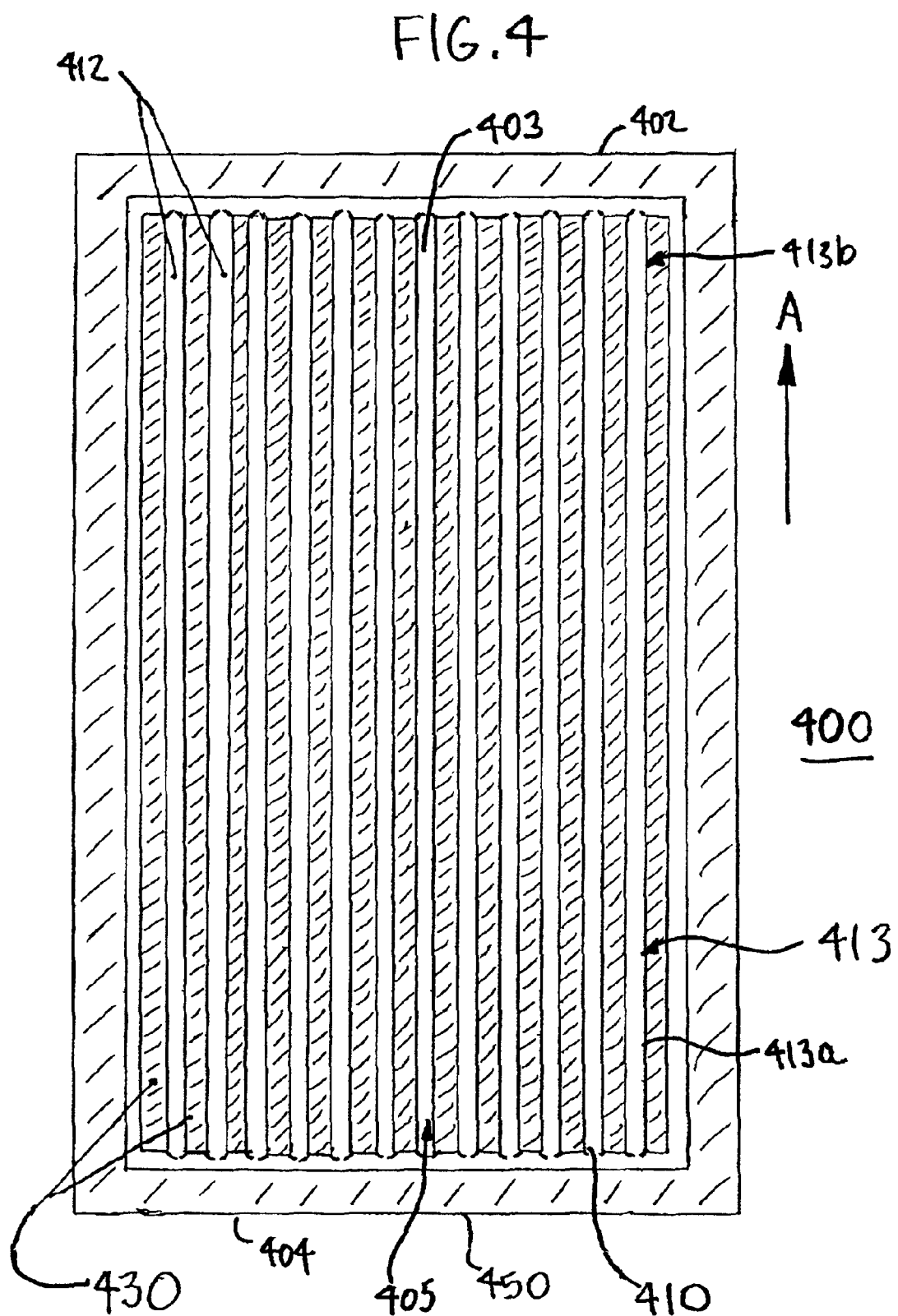
FIG. 4 is a front elevation view of a variation of the heat pipe assembly of FIG. 3.

In another embodiment of a heat pipe assembly 400, shown in FIG. 4, each of the plurality of tubes 412 is sealed to act as an independent heat pipe 413 with no communication of fluid between heat pipes. The small tubes 412 are capable of withstanding a higher internal pressure than the vapor chamber without risk of rupture. Other aspects of assembly 400 are the same as or similar to assembly 100 of FIG. 3, including corrugated lid 410, evaporators 413a, condensers 413b, top 402, bottom 404, evaporator section 405, condenser section 403, plastic strips of material 430, 450. Descriptions of these features are not repeated.

In the exemplary embodiments, none of the heat pipes 113 or 413 has a wick. The exemplary assembly 100 is designed to be mounted vertically with the top 102 and bottom 104 as shown in FIG. 3; assembly 100 acts as a thermosyphon. Condensed fluid in the top (condenser) section 113b of each heat pipe 113 flows back to the bottom (evaporator) section 113a of each heat pipe 113 by operation of gravity. A wickless pipe 113 may be used in configurations where a relatively small heat pipe diameter is desired. One of ordinary skill in the art recognizes that a wick structure may be added if an apparatus according to the invention is to be positioned in a non-vertical position, or adapted for use in an environment (i.e., orbital spacecraft) without gravity. The wick returns condensed fluid from the condenser 113b to the evaporator 113a without relying upon gravity. Wicks may be used, so long as the diameter of each individual heat pipe 113 is sufficient to accommodate the wick.

In another variation of the exemplary embodiments, a portion of the condenser section 103 is made into a chamber or reservoir and filled with a noncondensible gas, forming a Variable Conductance Heat Pipe or VCHP. The VCHP tends to maintain the fuel cell stack at a more constant temperature. This reduces the effects of varying electrical load or varying sink temperature on the fuel cell temperature and efficiency.

An exemplary heat pipe assembly 100 may have about 14 heat pipes 113, each having an outside diameter of about 0.16 centimeters (0.062 inches), and reject heat at a rate of 104 Watts (7.4 Watts/heat pipe). However, assembly 100 may have any number of heat pipes 113 appropriate for the configuration and heat rejection rate desired.

The working fluid in heat pipes 113 may be any conventional working fluid, including but not limited to water, methanol, acetone, ammonia, sodium, and the like. One of ordinary skill in the art can readily select a working fluid that is appropriate for the temperature range of the environment in which heat pipe assembly 100 is to be used, and select a material for the envelopes (base plate 120 and lid 110) that is compatible with the working fluid.

Another aspect of the invention is a fuel cell stack including a plurality of fuel cells in a stack, with at least one cooling assembly 100 interposed between adjacent cells. By removing heat from the fuel cells in the center of the fuel cell stack, this configuration allows a large number of cells to be stacked without creating unacceptably high temperatures in the center cells.

FIG. 5 is a front elevation view of a first exemplary fuel cell stack assembly 509 containing a cooling device 502 (including heat pipe assembly 100 and fins 587) and a fuel cell 585. FIG. 6 is a side edge elevation view of a single module 501 including an exemplary fuel cell 585 and cooling device 502. It is understood that a complete fuel cell stack 509 may include any number of modules 501 to provide a desired voltage, each module 501 containing a respective fuel cell 585 and a cooling device 502. In one example, 49 cells may be stacked together with intervening cooling devices 502, but fewer or more cells may be included.

The assembly 100 extends upwards out of the cell stack 509 to form an array 586 of parallel plate fins 587. Any type of fins may be used. For example, as shown in FIG. 6, plate fins having suitable rectangular holes can be pushed over the ends of one or more assemblies 100 to form a stack. Alternatively, as shown in FIG. 8, folded fin stock may be bonded to the protruding portion of the heat pipe assembly to provide an extended surface for improving heat transfer.

Figure 7:
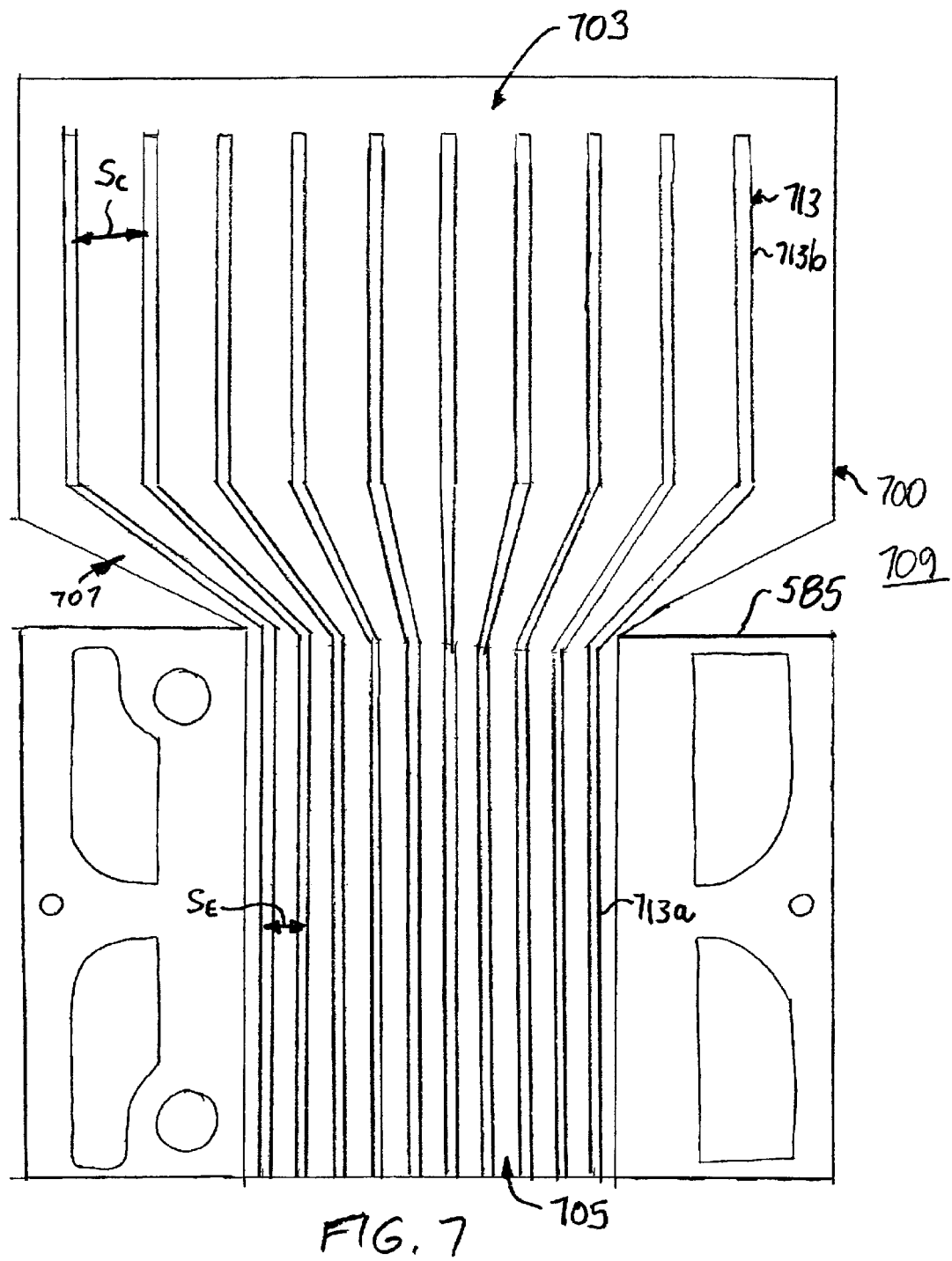
FIG. 7 is a front elevation view of a second exemplary embodiment of a fuel cell stack including a heat pipe assembly according to the invention.

FIGS. 7 and 8 show a second exemplary fuel cell stack 709, including fuel cells 585 and a second exemplary cooling device 702. Cooling device 702 includes folded fins 792 and a second embodiment of heat pipe assembly 700, including a fan-out section 707 above the fuel cells 585. Because of fan-out section 707, the spacing $S_C$ between condensers 713b of adjacent heat pipes 713 (in condenser section 703) is greater than the spacing $S_E$ between evaporators 713a of adjacent heat pipes 713 (in evaporator section 705). The increased area of condenser section 703 and increased spacing $S_C$ allows greater heat rejection from each cooling device 702 than from a comparable cooling device 502 having the same evaporator section 505.

For fuel cell stacks 509 (or 709), adjacent cooling devices 502 (or 702) may be at different potentials if the cooling devices are bonded to a metallic or active part of the fuel cells 585. In this case, conductive paths between cooling devices must be avoided, so that the cells are not shorted. In the case of either plate fins 585 or folded fins, this can be accomplished by inserting thin strips of fish paper or other electrical insulation (e.g., glass, rubber, plastic or the like) between adjacent cooling devices 502 (or 702). This has a minimal impact on the area available for heat transfer. The material can also serve as a spacer to block air bypass round loosely-fitting or poorly toleranced components and increase the useful flow through the finstack.

FIG. 8 is an isometric view of fuel cell stack 709. A folded fin 792 is included. The base plate 720 of one of the cooling devices 702 is shown. For each pair of consecutive cooling devices 702, an insulating layer 790 as described above is inserted between the folded fin 790 and one of the cooling devices.

Preferably, the insulating layer 790 is inserted adjacent to the corrugated lid 710 of the cooling device 709. The electrical insulator 790 may interfere with heat transfer between the cooling device and the folded fin 792. (Although thermally conductive, electrically insulating materials, such as beryllia may be used for insulating layer 790, they are more expensive than thermally insulating electrical insulators.) The flat base plate 720 provides a better thermal conduction interface than the corrugated lid 710, because of greater contact area. By providing direct contact between folded fin 792 and the base plate 720 of one cooling device 709, an adequate heat transfer path is provided, even with insulator 790 present. Nevertheless, it is also possible to form assemblies in which the heat transfer path is by way of contact between the fin 792 and the heat pipes 713 of the corrugated lid. The flattened configuration of the heat pipes 713 increases the heat transfer surface for this purpose.

Preferably, the compression force holding the fuel cells together (e.g., by bolts, not shown) is sufficient to maintain a good thermal conduction interface between the folded fin 792 and the heat pipe assembly 700. Alternatively, conventional means for improving a thermal contact interface may be used, including for example, a layer of tin, indium or thermal grease.

An exemplary fuel cell stack includes 48 cooling devices 709. Devices 709 are made from copper, using water as the working fluid. Flow within each heat pipe 713 has a Reynolds number about 1600. With a finstack 792 projecting above the top of the fuel cells 585, a convection coefficient of 28 $W/m^2$-K is achieved.

Although FIGS. 5 and 6 show a cooling device 502 having plate fins 587, wherein the spacing between heat pipes 113 is the same in the condenser section 103 and evaporator section 105, and FIGS. 7 and 8 show a cooling device 709 having folded fins 792 wherein the spacing $S_C$ in the condenser section 703 is greater than the spacing $S_E$ in the evaporator section 705, other combinations are possible. For example, a cooling device having plate fins as shown in FIG. 6 may have a fan-out section as shown in FIG. 7. Alternatively, a cooling device having a folded fin as shown in FIG. 8 may have the same spacing between heat pipes in the evaporator and condenser sections, as shown in FIGS. 3 or 4.

Although the example shows a one-to-one ratio between fuel cells 585 and cooling devices 502, the ratio of fuel cells 585 to cooling devices 502 may be different from one. For example, there may be one cooling device 502 for every two fuel cells 585, or one cooling device 502 for every three fuel cells 585. One of ordinary skill can readily determine the heat rejection requirement for any given fuel cell stack 509, and incorporate the necessary number of cooling devices 502.

Another aspect of the invention is a method of forming a heat pipe assembly 100. A base plate 120 and a corrugated lid 110 are provided. The corrugated lid 110 has at least two, and preferably several, embossed grooves or trenches that become tubes 112 after the base plate 120 and lid 110 are joined. Lid 110 may be formed by a conventional process, such as stamping. Both the base plate 120 and lid 110 may be formed of copper, aluminum or another highly conductive material.

In a joining step, the corrugated lid 110 is joined to the base plate 120 to form a plurality of tubes 112 therebetween. The joining step may include welding or brazing the base plate 120 and the corrugated lid 110, or equivalent operation, such as soldering, conductive adhesive and the like. Each of the plurality of tubes 112 forms an envelope of a respective heat pipe 113 within the heat pipe assembly 100. If the embossed lid has no connecting tubes 160 or 170, then the joining step seals each of the plurality of tubes 112 to act as an independent heat pipe 113 with no communication of fluid between heat pipes.

In an inserting step, at least one strip of material 130 is inserted between an adjacent pair of tubes 112 from among the plurality of tubes. Preferably, a respective strip of plastic material 130 is inserted between each respective pair of adjacent tubes 112.

A sufficient load 140 is applied to deform the corrugated lid 110, so as to flatten a side surface of each of the plurality of tubes 112. The strips of material 130 act as stops to limit the flattening of the side surfaces of the plurality of tubes 112. If the heat pipe assembly 100 is installed in a fuel cell stack 509 between fuel cells, the fuel cells are normally clamped together to create the stack, thereby providing the desired compression.

Although an exemplary use for cooling a fuel cell stack is disclosed, one of ordinary skill in the art can readily recognize a variety of devices and systems that can be cooled using a heat pipe assembly as described above, or equivalent thereof.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. A heat pipe assembly, comprising:
   a base plate;
   a corrugated lid joined to the base plate to form a plurality of tubes therebetween, each of the plurality of tubes forming an envelope of a respective heat pipe within the heat pipe assembly; and further comprising at least one strip of material between an adjacent pair of tubes from among the plurality of tubes.

2. The heat pipe assembly of claim 1, wherein each of the plurality of tubes and the strip of material have a height in a direction perpendicular to an axial direction of the tubes, and the height of the strip of material is less than the height of the tubes.

3. The heat pipe assembly of claim 2, wherein a side surface of each of the plurality of tubes is flattened, and the strip of material acts as a stop to limit flattening of the side surfaces of the plurality of tubes.

4. The heat pipe assembly of claim 1, wherein the assembly has at least three tubes and at least two strips of material, each strip of material between a respective pair of adjacent tubes.

5. The heat pipe assembly of claim 1, wherein the strip of material is made of a polymer.

6. The heat pipe assembly of claim 1, wherein the base plate and corrugated lid are attached by a welding joint or a brazing joint.

7. The heat pipe assembly of claim 1, wherein none of the heat pipes has a wick.

8. A heat pipe assembly, comprising:
   a base plate;
   a corrugated lid joined to the base plate to form a plurality of tubes therebetween, each of the plurality of tubes forming an envelope of a respective heat pipe within the heat pipe assembly; and
   wherein the base plate and corrugated lid are both formed of copper.

9. A heat pipe assembly, comprising:
   a base plate;
   a corrugated lid joined to the base plate to form a plurality of tubes therebetween, each of the plurality of tubes forming an envelope of a respective heat pipe within the heat pipe assembly; and
   wherein each of the plurality of tubes is sealed to act as an independent heat pipe with no communication of fluid between heat pipes.

10. A heat pipe assembly, comprising:
    a base plate;

a corrugated lid joined to the base plate to form a plurality of tubes therebetween, each of the plurality of tubes forming an envelope of a respective heat pipe within the heat pipe assembly; and wherein all of the plurality of tubes are connected at one end or at both ends, allowing communication of fluid between heat pipes.

11. The heat pipe assembly of claim 10, further comprising a manifold connecting a vapor outlet of each heat pipe and a liquid return line of each heat pipe together.

12. A fuel cell stack, comprising:

at least one fuel cell; and a heat pipe assembly conductively coupled to the fuel cell, the heat pipe assembly comprising:

a base plate, and a corrugated lid joined to the base plate to form a plurality of tubes therebetween, each of the plurality of tubes forming an envelope of a respective heat pipe within the heat pipe assembly; and further comprising at least one strip of material between an adjacent pair of tubes from among the plurality of tubes.

13. The fuel cell stack of claim 12, wherein the heat pipe assembly has an evaporator section conductively coupled to the fuel cell, and a condenser section extending beyond the fuel cell.

14. The fuel cell stack of claim 13, wherein the condenser section has a plurality of fins attached thereto.

15. The fuel cell stack of claim 14, wherein the condenser section has a width that is greater than a width of the evaporator section, and a spacing between adjacent heat pipes is greater in the condenser section than in the evaporator section.

16. The fuel cell stack of claim 12, further comprising:

a second heat pipe assembly, the fuel cell being positioned between an evaporator section of the first heat pipe assembly and an evaporator section of the second heat pipe assembly;

a fin stack between a condenser section of the first heat pipe assembly and a condenser section of the second heat pipe assembly; and an electrical insulator between the fin stack and the condenser section of the second heat pipe assembly.

17. The fuel cell stack of claim 16, wherein the electrical insulator contacts the corrugated lid of the second heat pipe assembly.

18. The fuel cell stack of claim 12, further comprising:

a second fuel cell, wherein a side surface of each of the plurality of tubes is flattened between the first fuel cell and the second fuel cell.

19. The fuel cell stack of claim 18, further comprising at least one strip of material positioned between an adjacent pair of tubes in the heat pipe assembly, the strip of material acting as a stop to limit flattening of the plurality of tubes.

20. A method of forming a heat pipe assembly, comprising the steps of:

providing a base plate;

joining a corrugated lid to the base plate to form a plurality of tubes therebetween, each of the plurality of tubes forming an envelope of a respective heat pipe within the heat pipe assembly; and further comprising inserting at least one strip of material between an adjacent pair of tubes from among the plurality of tubes.

21. The method of claim 20, further comprising flattening a side surface of each of the plurality of tubes.

22. The method of claim 20, further comprising flattening a side surface of each of the plurality of tubes, wherein the strip of material acts as a stop to limit said flattening of the side surfaces of the plurality of tubes.

23. The method of claim 20, wherein the assembly has at least three tubes and at least two strips of material, and the method includes inserting a respective strip of material between each respective pair of adjacent tubes.

24. The method of claim 20, wherein the strip of material is made of a polymer.

25. The method of claim 20, wherein the joining step includes welding or brazing the base plate and the corrugated lid.

26. The method of claim 20, wherein the joining step includes sealing each of the plurality of tubes to act as an independent heat pipe with no communication of fluid between heat pipes.

27. The method of claim 20, further comprising connecting all of the plurality of tubes at one end or at both ends, so as to allow communication of fluid between heat pipes.

28. The method of claim 27, further comprising connecting a vapor outlet of each heat pipe arid a liquid return line of each heat pipe together.

29. A method of forming a heat pipe assembly, comprising the steps of:

providing a base plate;

joining a corrugated lid to the base plate to form a plurality of tubes therebetween, each of the plurality of tubes forming an envelope of a respective heat pipe within the heat pipe assembly; and further comprising forming the base plate and corrugated lid of copper before the joining step.

30. A method of forming a heat pipe assembly, comprising the steps of:

providing a base plate;

joining a corrugated lid to the base plate to form a plurality of tubes therebetween, each of the plurality of tubes forming an envelope of a respective heat pipe within the heat pipe assembly; and further comprising stamping a sheet of metal to form the corrugated lid before the joining step.

31. A fuel cell stack, comprising:

at least one fuel cell; and a heat pipe assembly conductively coupled to the fuel cell, the heat pipe assembly comprising:

a base plate and a corrugated lid joined to the base plate to form a plurality of tubes therebetween, each of the plurality of tubes forming an envelope of a respective heat pipe within the heat pipe assembly and further comprising at least one strip of material between an adjacent pair of tubes from among the plurality of tubes, wherein said heat pipe assembly has an evaporator section conductively coupled to said fuel cell, and a condenser section extending beyond the fuel cell wherein a portion of said condenser section includes a chamber filled with a noncondensible gas so as to form a variable conductance heat pipe.

* * * * *